(12) United States Patent
Diemer et al.

(10) Patent No.: US 6,318,565 B1
(45) Date of Patent: Nov. 20, 2001

(54) FILTRATION MEMBER FOR SOLID-LIQUID SEPARATION

(75) Inventors: Wolfgang Diemer; Markus Kolczyk, both of Waldstetten (DE)

(73) Assignee: SeitzSchenk Filtersystems GmbH (DE)

( * ) Notice: Subject to any disclaimer, the term of this patent is extended or adjusted under 35 U.S.C. 154(b) by 0 days.

(21) Appl. No.: 09/402,424

(22) PCT Filed: Jan. 19, 1999

(86) PCT No.: PCT/EP99/00291

§ 371 Date: Oct. 5, 1999

§ 102(e) Date: Oct. 5, 1999

(87) PCT Pub. No.: WO99/39805

PCT Pub. Date: Aug. 12, 1999

(30) Foreign Application Priority Data

Feb. 5, 1998 (DE) .............................. 198 04 493

(51) Int. Cl.[7] .................................................. B01D 29/01
(52) U.S. Cl. ..................... 210/499; 210/483; 210/500.1; 442/40; 442/41
(58) Field of Search ....................... 210/499, 483, 210/500.1; 264/138, 239; 72/22; 428/9; 442/38, 40, 41

(56) References Cited

U.S. PATENT DOCUMENTS

| | | | |
|---|---|---|---|
| 381,990 | * | 5/1888 | Driller . |
| 2,979,209 | * | 4/1961 | Nolden . |
| 3,640,760 | * | 2/1972 | Nichols, Jr. . |
| 4,001,366 | * | 1/1977 | Brumlik . |
| 5,190,653 | * | 3/1993 | Herrick et al. . |
| 5,399,265 | * | 3/1995 | Nehls . |
| 6,021,905 | * | 2/2000 | Frejborg . |

* cited by examiner

*Primary Examiner*—Ana Fortuna
(74) *Attorney, Agent, or Firm*—R. W. Becker & Associates; R. W. Becker

(57) ABSTRACT

A filter medium for solid/liquid separation has a sheet of a metallic material or plastic. The sheet has a plurality of openings. The openings are slots having a slot width and are produced by drawing a drawn grid structure and subsequently mechanically plastically reverse-deforming the drawn grid structure.

17 Claims, 1 Drawing Sheet

FILTRATION MEMBER FOR SOLID-LIQUID SEPARATION

BACKGROUND OF THE INVENTION

The invention relates to a filter medium for solid/liquid separation, preferably as a deposit support for a deposit filter and for cake-forming filtration according to the type specified in the preamble of claim 1.

The operating principle of deposit filters includes the initial deposition of a filter layer which extends across the openings of a deposit support. First, a base deposition is carried out to form a first pre-deposit by flowing the deposit material in a fast circulation through the filter so that in this manner a thin layer of particles is formed on the filter surfaces. Since the deposit material, in many applications silica gel, has a particle spectrum of 0.3 μm to approximately 50 μm, and the deposit support has usually openings of a magnitude of 60 μm to 100 μm, the deposit layer can be formed only when a plurality of particles become wedged in the opening so as to form a bridge so that thereby penetration of the opening is hindered. With the second initial deposition a cake of a layer thickness of 0.5 mm to 1.0 mm is then built.

According to the operating principle of a cake-forming filtration, foreign filter aids that are deposited onto a filter medium are completely unnecessary. The solids which are contained in the suspension to be filtered grow directly on the surface of the filter medium to a deposit or filter cake while the filtrate is removed through the filter medium.

Depending on the field of application of the filter different filter media can be used. Deposit supports comprised of a plastic fabric or a metal fabric as well as slotted sieves are the most common embodiments for a deposit filtration. For filters such as single layer filters or suction filters or single layer process filters or dry filters it is also known to employ sinter materials such as, for example, multi-layer sinter fabrics, sinter fleece, or sintered powder sheets. An opening magnitude of approximately 55 μm is the lower limit of practical, useful structures in the known fabric embodiments because for a mesh width that is smaller the fibers would have to be so thin that the rip stability no longer would be sufficient. Moreover, the ratio of the surface area of the openings to the total surface area is fixed and not variable.

It is an object of the present invention to provide a filter medium for the solid/liquid separation that, even for low particle size or fine particle size distribution of the filter aid, quickly and reliably forms a stable uniform filter layer across the entire filter surface.

SUMMARY OF THE INVENTION

This object is solved by a filter medium with the features of claim 1.

The essential advantages of the invention are that due to the minimal size of the openings the filter cake is formed much quicker or the required filter layer is deposited faster; in the latter case only a single pre-deposit is required. This results in a considerable reduction of cost due to time savings and reduced amounts of the required filter aid. The inventive filter medium is robust and has a long service life. Furthermore, it can be cleaned easily because of its smooth surface. Back flow properties for the purpose of cleaning are also realized because of the form stability of the material. The filter medium is comprised of a thin plate or foil and can be produced inexpensively as a drawn grid structure that, in comparison to metal fabrics, has substantially improved filtration properties. This is so because the risk that the deposit layer will collapse in the area of one or more openings and thus reduce the filter effect is considerably reduced. Drawn grid structures are known in the art. However, they are conventionally produced with large mesh width, i.e., the proportion of openings relative to the total surface area is large (compare DIN 791).

Since a single pre-deposit is sufficient and a filter aid of medium to fine particle size distribution is sufficient for this purpose, such a filter medium is suitable also for use of regenerated diatomaceous earth and other filter media that can be regenerated as well as different absorption media.

The filter medium comprises a certain form stability that depends, of course, on the thickness of the plate and the type of material, as well as on the number and size of the openings in the plate. Since therefore a large number of parameters must be taken into consideration, shaped parts of a suitable shape can be produced and adapted for the respective use, for example, as a hollow cylinder, as a tub or disk-shaped structure, etc.

Since the individual openings of the plate forming the filter medium are not connected to one another, no transverse flow can occur within the plate so that the edge portion of the filter medium in can be sealed in a simple manner. The plate can be used on all disk filter elements that in the past have been provided with conventional fabrics without having to change the fastening device. This not only allows to fit new filter elements directly without system changeover with the inventive filter medium, but it is also possible to retrofit already operating filters without problems.

The inventive filter medium provides the possibility to vary the free opening surface area relative to the total surface area of the filter medium over a large range. This can be achieved by varying the opening size and the number of openings. The opening size can be determined by the manufacturing tool. A special advantage is that with the invention a free opening surface area can be achieved which is, for example, in the range of 0.5% to 15.0% of the total surface area of the filter medium. The height distribution of the filter cake can thus be more uniform. This effect is especially extremely important in the first phase of the filtration. A further possibility of affecting the opening size is their size determination via the amount of the reverse deformation so that the respectively set requirements with respect to the free opening surface area and the opening size can be taken into consideration.

The material thickness of the thin plate or of the foil, is preferably 0.1 mm to 1.5 mm. The material thickness can be determined as a function of the mechanical properties of the respective material and the required stiffness of the filter medium. The material for the filter medium is especially stainless steel or stainless steel alloys, non-iron metals or aluminum alloys or other corrosion-resistant materials, especially plastic. The selection should be based on the respective mechanical and/or chemical requirements.

The smooth surface area of the plate provides very good cake removal for horizontal disk filters which are rotated for this purpose so that the filter cake is spun off in the outward direction. Furthermore, the material has no preferred orientation, which is especially important when employing the material on rotating filter elements with radial symmetry stress. Depending on the respective metal, welding of the filter medium is possible which may be advantageous when a filter medium is comprised of a plurality of parts or is to be connected to supporting elements.

The invention allows the production of slot widths up to a minimum of approximately 5 μm. Depending upon the employed filter aids and the consistency of the liquid to be filtered, slot widths between 5 µm and 300 µm can be viewed as the preferred slot width. The length of the slots is preferably between 0.5 mm and 15 mm.

The reverse deformation of the drawn grid structure is preferably carried out by rolling so that the desired final dimensions are very precisely achieved. In this manner, a high finishing precision with a uniform and constant product quality results. The openings extend in the filter medium substantially at a right angle to the surface of the filter medium so that the openings can be cleaned easily because the openings open slightly conically and are clearly defined. The surface of the filter medium can be electrochemically treated for producing special surface properties or can be mechanically ground. For preparing the filter medium for use under extreme chemical conditions, it is expedient to coat the surface of the filter medium with a layer of chemically resistant material. This can be especially the same material that is also used for coating the inner wall of the container.

BRIEF DESCRIPTION OF THE DRAWING

An embodiment of the invention will be explained in the following with the aid of the drawing.

The drawing shows in.

DESCRIPTION OF PREFERRED EMBODIMENTS

Figure 1:
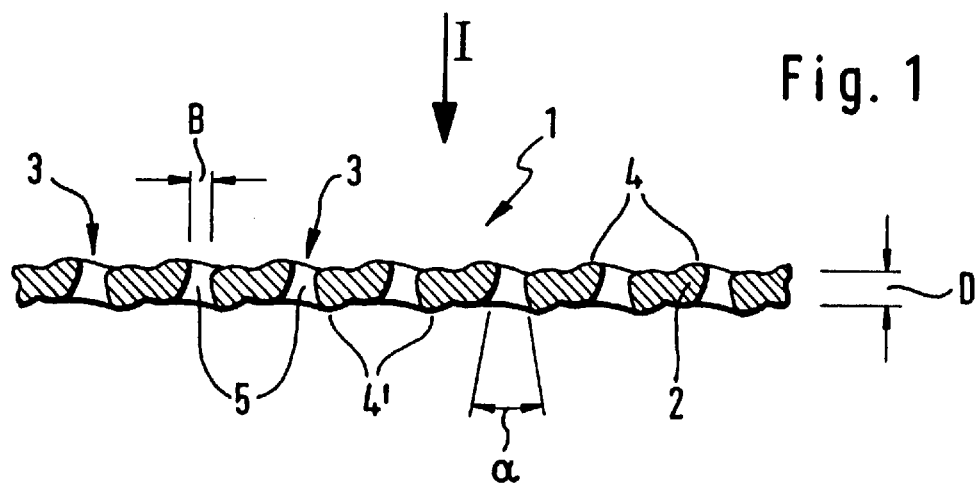
FIG. 1 a portion of a longitudinal section of the filter medium.

FIG. 1 shows a view enlarged multiple times and without being to scale of a portion of the filter medium 1 that is preferably a fine sheet metal 2 having a thickness D of approximately 0.5 mm. A plurality of openings 3 has been produced in this fine sheet metal 2 by a method for forming a drawn grid structure with a corresponding tool. The openings 3 have regular spacings to one another. By rolling the drawn grid structure a reverse deformation of the fine sheet metal 2 takes place so that it is substantially returned to the initial size D. In addition to the openings 3 projections pointing upwardly past the actual sheet metal plane remain. At the top side of the sheet metal the projections are identified by reference numeral 4 and at the underside by reference numeral 4'. After completion of the rolling process, the openings 3 are compressed to narrow slots 5 whereby the slot width B is between 5 µm and 300 µm. Preferably, the slot width B is approximately 35 µm. The slots 5 are slightly conically shaped with downwardly oriented widening portion whereby this cone angle α is at least 1°, preferably 5° to 60°.

Figure 2:
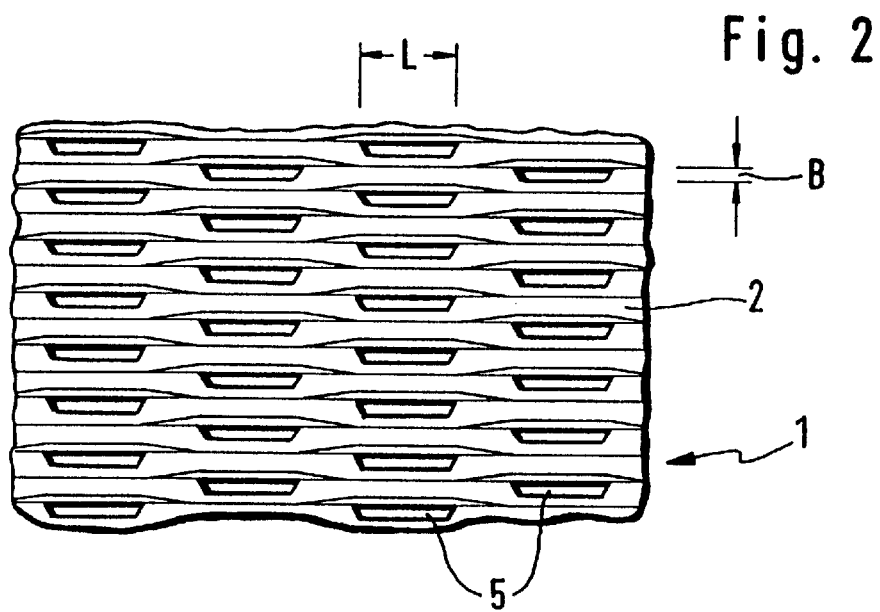
FIG. 2 a plan view onto the filter medium in the direction of arrow 11 in FIG. 1 at a reduced scale in comparison to FIG. 1.

In FIG. 2 a plan view onto the fine sheet metal 2 of the filter medium 1 according to arrow I in FIG. 1 is shown. It shows a plurality of slots 5 arranged in uniform arrangement across the fine sheet metal 2. These slots 5 are arranged in aligned rows whereby two adjacent rows are staggered relative to one another. While the slot width B of at least 5 µm, as mentioned above, is very small and is preferably in the area of approximately 35 µm, the slot length L can be within the range of 0.5 mm to 20 mm. The free opening surface area, relative to the total surface area of the filter medium 1, is preferably in the range of 0.5% to 15.0%. This free opening surface can be determined by the number as well as the size of the openings.

Figure 3:
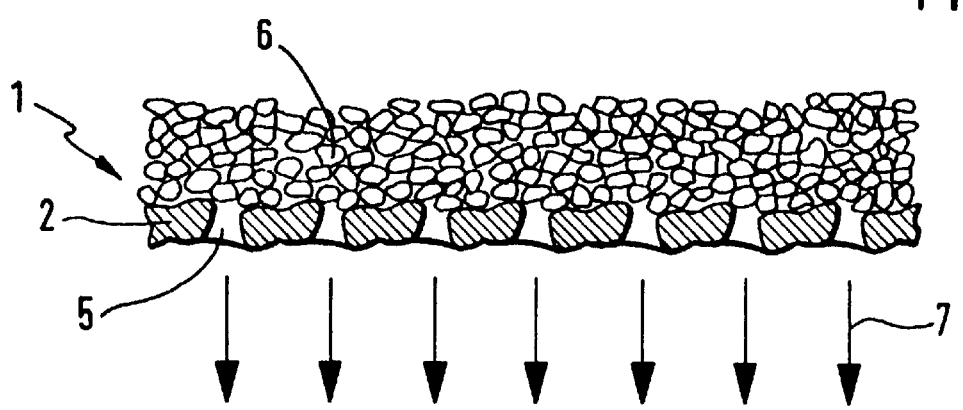
FIG. 3 a representation of the filter medium as shown in FIG. 1 used as a deposit support with deposited filter cake.

FIG. 3 shows a section of the filter medium 1 that, as an example, is embodied as a deposit support of a fine sheet metal 2, as disclosed already in connection with FIG. 1. On this deposit support a deposit layer 6 is provided which is part of a filter cake that has been deposited as a deposit layer on the fine sheet metal 2. Since the slot width B of the slots 5 is very narrow, the particles of the suspension are prevented from penetrating the slots 5. Since the length L of the slots 5, in general, is considerably greater than the slot width and also the size of the particles, the liquid can penetrate the openings 3, as represented schematically by the arrows 7 indicating the openings. In this manner, a filtrate of a very high degree of purity exits at the downstream side of the deposit support. As can be seen in FIGS. 1 and 3, the openings 3 extend substantially at a right angle to the sheet metal plane. These openings 3 widen conically in the flow direction and have substantially flat surfaces. Accordingly, the deposit support can be cleaned easily. Even though the filter medium is made of a fine sheet metal, in the shown embodiment the invention can also be realized with other suitable materials, such as especially plastic material. As an example, PVC, PE, PP, or PVDF should be mentioned.

The present invention is, of course, in no way restricted to the specific disclosure of the specification and drawings, but also encompasses any modifications within the scope of the appended claims.

What is claimed is:

1. A filter medium (1) for solid/liquid separation, said filter medium comprising:

a sheet (2) of a metallic material or a plastic material;

said sheet (2) having a plurality of openings (3), said openings (3) are slots (5) having a slot width (B) and being produced by drawing a drawn grid structure and subsequently mechanically plastically reverse-deforming said drawn grid structure, wherein said openings (3) widen at a widening angle (α) in a flow direction of a material to be filtered.

2. A filter medium (1) according to claim 1, wherein said drawn grid structure is reverse deformed by rolling.

3. A filter medium according to claim 1, wherein said slots (5) define a free opening surface area and wherein said free opening surface area is 0.5% to 15% of a total surface area of said sheet (2).

4. A filter medium (1) according to claim 1, wherein said widening angle (α) is at least 1°.

5. A filter medium according to claim 4, wherein said Widening angle (α) is 5° to 60°.

6. A filter medium (1) according to claim 1, wherein said sheet (2) has a material thickness (D) is 0.1 mm to 1.5 mm.

7. A filter medium (1) according to claim 1, wherein said sheet (2) is a foil.

8. A filter medium (1) according to claim 1, wherein said metallic material is a stainless steel sheet metal, nickel alloy, on-iron metal material, or aluminum alloy.

9. A filter medium (1) according to claim 1, wherein plastic material is PVC, PE, PP, or PVDF.

10. A filter medium (1) according to claim 1, wherein said slot width (B) is between 5 µm and 300 µm.

11. A filter medium (1) according to claim 1, wherein said slots (5) have a length (L) of between 0.5 mm and 20 mm.

12. A filter medium (1) according to claim 1, wherein said slots (5) extend substantially at a right angle to a surface of said sheet (2).

13. A filter medium (1) according to claim 1, wherein said slots (5) are arranged in aligned rows.

14. A filter medium (1) according to claim 13, wherein said slots (5) of two adjacent ones of said rows are staggered relative to one another.

15. A filter medium (1) according to claim 1, wherein said sheet (2) has an electrochemically treated surface.

16. A filter medium (1) according to claim 15, wherein said sheet (2) has a surface coated with a layer of a chemically resistant material.

17. A filter medium (1) according to claim 16, wherein said sheet (2) has a mechanically ground surface.

* * * * *

UNITED STATES PATENT AND TRADEMARK OFFICE
CERTIFICATE OF CORRECTION

PATENT NO.    : 6,318,565 B1  
DATED         : November 20, 2001  
INVENTOR(S)   : Wolfgang Diemer et al.

Page 1 of 1

It is certified that error appears in the above-identified patent and that said Letters Patent is hereby corrected as shown below:

<u>Title page,</u>
Item [54], should read as follows:

-- [54] Title: FILTER MEDIUM FOR SOLID/LIQUID SEPARATION --

Signed and Sealed this

Twenty-sixth Day of March, 2002

Attest:

*Attesting Officer*

JAMES E. ROGAN
*Director of the United States Patent and Trademark Office*